UNITED STATES PATENT OFFICE.

FREDERICK B. HOWARD, OF NEW YORK, N. Y.

IMPROVEMENT IN STRAW CONCRETE.

Specification forming part of Letters Patent No. 161,038, dated March 23, 1875; application filed February 11, 1875.

*To all whom it may concern:*

Be it known that I, FREDERICK B. HOWARD, of the city, county, and State of New York, have invented a certain compound called Straw Concrete, to be used as a substitute for wood for certain purposes for which that material is used, of which the following is a specification:

The nature of my invention consists in mixing straw with silicate of soda, clay, and sand, saturating the product with coal-tar.

To prepare the straw concrete, take a quantity of wheat, rye, or oat straw, and cut it in pieces two or three inches long; then treat it with caustic soda in sufficient quantity to thoroughly soften it, say about four ounces of the caustic soda to one pound of straw. Then the caustic soda is to be washed out with water, and after that the straw is to be dried as much as possible by pressing out the water. Then mix the straw so prepared with clay and sand, say twelve pounds of clay and six pounds of sand to one pound of straw, or a sufficient quantity of clay and sand to make it a plastic substance. Then this material is combined with silicate of soda, say six pounds of silicate of soda to the quantities above given. This composition is then to be put in a mold and pressed. After it is taken from the mold it is to be dried, and then saturated with coal-tar or some other similar substance. The object of saturating the composition is to prevent it from absorbing moisture.

I propose to use this straw concrete for railroad-ties, inner walks, flooring for barns and outhouses, building and other architectural purposes.

I claim as my invention—

A compound composed of straw, silicate of soda, clay, sand, and coal-tar, substantially in the proportions and for the purposes set forth.

FREDK. B. HOWARD.

Witnesses:
HAMILTON B. TOMPKINS,
HENRY F. KILBURN.